Figure 1:
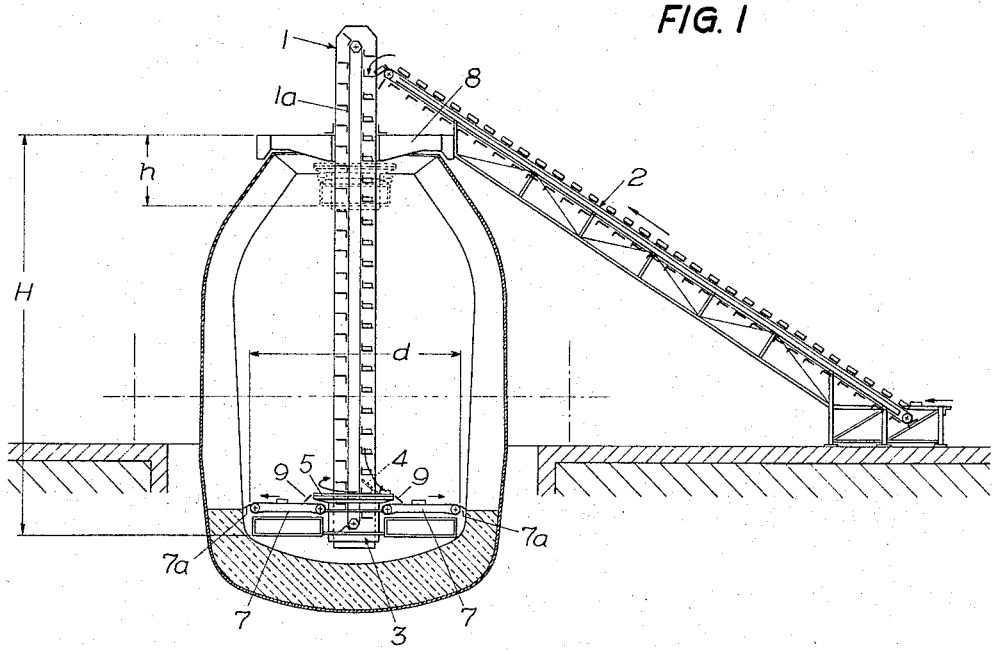

Nov. 15, 1966    P. PUXKANDL ET AL    3,285,390
APPARATUS FOR LINING METALLURGICAL VESSELS, SUCH AS CONVERTERS
Filed Dec. 17, 1964    3 Sheets-Sheet 1

INVENTORS:
PETER PUXKANDL
HELMUT SMEJKAL
BY
THEIR ATTORNEYS

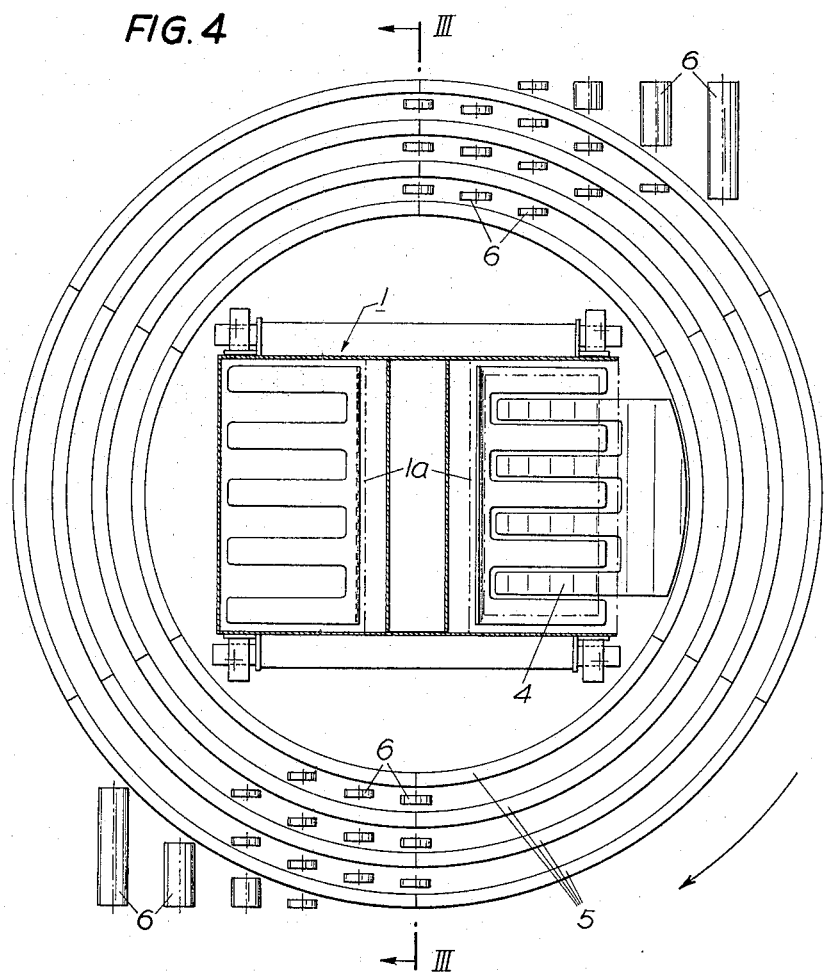

3,285,390
APPARATUS FOR LINING METALLURGICAL VESSELS, SUCH AS CONVERTERS
Peter Puxkandl and Helmut Smejkal, Linz, Austria, assignors to Vereinigte Osterreichische Eisen- und Stahlwerke Aktiengesellschaft, Linz, Austria, a company of Austria
Filed Dec. 17, 1964, Ser. No. 419,060
Claims priority, application Austria, Dec. 23, 1963, A 10,375
5 Claims. (Cl. 198—103)

The increasing use of oxygen top-blowing processes for making steel involves an increase in the size of the crucible vessels and gives rise to the problem to minimize the investment and operating costs. Particularly the use of top-blowing converters requires the provision of one stand-by vessel whereas another vessel is in operation. This stand-by vessel must be provided with a refractory lining as quickly as possible. This work involves very high costs because many tons of refractory material must be introduced into the vessel and must be placed by masons. The refractory material has a very heavy weight and its placing is a very difficult work for the masons. It has been endeavored to find ways and means to facilitate this work. In practice, however, the masons must still take the refractory bricks or medium-size blocks from a skip lowered at the center of the vessel and must place these bricks or blocks at the walls of the vessel. Depending on the size of the vessel, the workers must walk several meters while carrying the bricks. For lining metallurgical vessels which are accessible from below, such as basic Bessemer converters, elevators have been provided, which carry the refractory material and the workers for placing the lining. Such elevators have also been moved into the converter from above. In this case, the lining material was supplied from above. It is an object of the invention to facilitate the manual work of the masons placing the refractory lining of metallurgical vessels particularly converters, to reduce the carrying work and to render the supply of material more efficient.

In such an apparatus, the present invention provides a conveyor, which feeds the refractory material from the furnace platform or from a platform in a separate lining room to a paternoster elevator, which is introduced into the metallurgical vessel by means of a crane or the like lifting tackle and carries a working platform, which is adapted to be lifted along the paternoster elevator and from which the lining material moved up or down by the paternoster elevator can be moved within the vessel without heavy physical work to positions where they are to be placed. The manual work of the masons is then restricted to the placing of the bricks exactly into position and the application of any mortar which may be required. Details and further advantages of the invention will be explained more fully with reference to the following description of the drawings.

Figure 2:
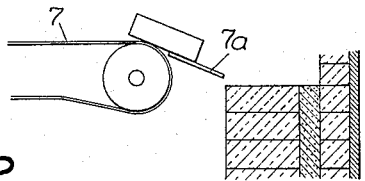
Figure 5:
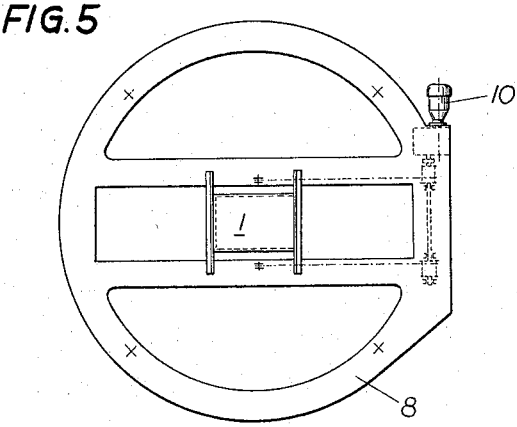
Figure 6:
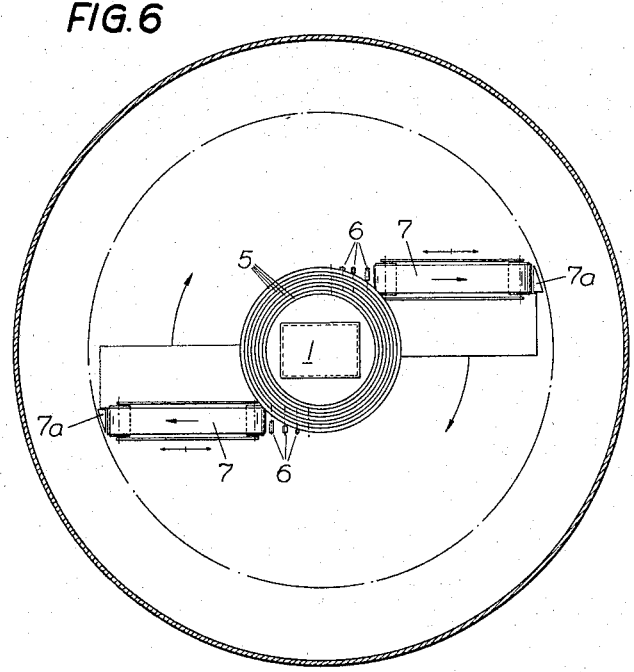

In the accompanying drawings, FIG. 1 is a general diagrammatic view of the apparatus as applied to a top-blowing converter. FIG. 2 shows details of the apparatus so that the deposition of the refractory bricks at the position at which they are to be placed in the converter is apparent. FIGS. 3 and 4 are a front elevation and a top plan view, respectively, showing the device for distributing the refractory bricks on the working platform. FIG. 5 shows the frame for suspending the paternoster elevator and the working platform, and FIG. 6 is a top plan view showing the working platform.

FIG. 1 is a transverse sectional view showing a converter for top-blowing processes. The lining apparatus according to the invention is introduced from above into this converter. This apparatus consists of a paternoster elevator 1, which is supplied with the refractory bricks from a working platform by a conveyor belt or the like 2. The bricks may be placed on the conveyor belt or the like by hand or mechanically. The device which forms the paternoster elevator carries a working platform 3, which is adapted to be lifted along the paternoster elevator by any suitable means, such as a drive means 10 carried by the frame 8. This platform can also be rotated through any desired angle and can be fixed in any adjusted angular position. The paternoster elevator device is supported on the frame 8 at the mouth of the converter. The working platform 3 carries any desired number of rotatable rings 5, which are concentrically arranged and are tangentially adjoined by one or preferably two roller tracks 6, which lead to belt conveyors 7 mounted on the working platform. The platforms of the paternoster elevator have apertures, which are entered by finger-like portions 4, of guide plates. During the descent of the platforms of the paternoster elevator, the bricks lying on the platforms are lifted by the fingers of the guide plates 4 and the bricks slip onto the rings 5 and are carried along a circular path corresponding to the respective ring. The bricks move over one of the roller tracks 6 and are then deposited on one of the belt conveyors 7 and carried to the working position. At this working position, the refractory bricks supplied are removed by a guide plate 7a and moved to the position where the brick is to be placed. It is then sufficient for the mason to move the refractory brick exactly to the desired position by a slight manual deplacement of the bricks.

Owing to the tangential arrangement of the belt conveyors 7 on the working platform 3, these conveyor belts can be displaced in their longitudinal direction. This is necessary because the inside diameter of the converters or metallurgical vessels to be lined varies with the working height. When the vessel is to be lined in a region in which the diameter is relatively small, it is sufficient to move the working platform to the smaller working diameter by retracting the belt conveyors together with the working platform underneath. This can be controlled in a very simple manner with the technical means now available.

The provision of a plurality of concentric annular paths for carrying the bricks around the working platform has the advantage that operators are saved because the bricks which have been lowered onto the roller tracks 6 can perform one or more revolutions before they are placed when the roller tracks 6 are fully occupied in one direction.

Owing to the tangential longitudinal displaceability of the belt conveyors with the working platforms as described hereinbefore, the overall diameter of the working platforms, which are vertically displaceable along the paternoster elevator, can be varied. Depending on the diameter of the mouth of the converter, the entire apparatus, including the paternoster elevator with the working platform and the belt conveyors, can be lifted out of the conveyor when the lining has been completed. Within the scope of the invention, a tilting device may be provided by which the belt conveyors 7 and the working platform disposed below them can be tilted up or down.

It is apparent that the apparatus according to the invention enables a very fast lining of cavities of mainly vertically extending metallurgical apparatus with a minimum of physical work. These apparatus include converters as well as stack furnaces of all kinds. It does not make a difference whether the apparatus as a whole is moved into the vessel from above or below. Hence, the apparatus is equally suitable for lining bottom-blowing converters if the arrangement of the brick feeding means relative to the paternoster elevator is inverted and the apparatus itself is moved into the vessel from below rather than being suspended and lowered into the vessel.

It is obvious that the movement of the various elements may be automatically controlled individually or in dependence on each other.

What we claim is:

1. Apparatus for lining metallurgical vessels with refractory bricks, comprising a conveyor feeding said refractory bricks from an operating level to the charging device of a paternoster elevator adapted to be introduced into the interior of said vessel from one of the top and bottom sides thereof and carrying a working platform provided with a device for distributing said bricks, said distributing device comprising at least one rotating annular plate to which said bricks are supplied after being removed from said paternoster elevator by finger-like means and on which said bricks are distributed, and a device for feeding said bricks to working position.

2. Apparatus as set forth in claim 1, wherein the distributing device cooperates with sets of rollers by which said bricks traveling on said rotating annular plates are supplied to a device for feeding said bricks to working position.

3. Apparatus for lining metallurgical vessels, comprising a conveyor feeding refractory bricks from an operating level to the charging device of a paternoster elevator adapted to be introduced into the interior of said vessel and carrying a working platform provided with a distributing device comprising at least one constantly rotating annular plate to which said bricks are supplied after being removed from said paternoster elevator by finger-like means and on which said bricks are distributed, said distributing device cooperating with sets of rollers by which the bricks carried by said rotating annular plate are supplied to at least one belt conveyor mounted on said working platform and being aligned with said sets of rollers and tangential to said annular plates, for feeding said bricks to working position, said conveyor belts and the working platform parts carrying them being displaceable in their longitudinal direction so that the diameter of the working platform can be adjusted to the varying diameter of the vessel to be lined.

4. Apparatus as set forth in claim 3, wherein the working platform is adapted to be moved along the paternoster elevator carrying it.

5. Apparatus as set forth in claim 3, wherein the brackets provided on the paternoster elevator and carrying the working platform, and the parts thereon, including the conveyors and the distributing device, are adapted to be tilted to a substantially vertical position so that the entire apparatus can be moved into the vessel and out of the vessel, respectively, through an opening which is smaller in diameter.

References Cited by the Examiner
UNITED STATES PATENTS
3,033,389   5/1962   Abarotin et al. -------- 214—1

EVON C. BLUNK, *Primary Examiner.*

R. J. HICKEY, *Assistant Examiner.*